April 24, 1962 E. T. STRICKLAND 3,031,361
PROCESS FOR MAKING A WOUND LAMINATE AND ARTICLE THEREOF
Filed Jan. 22, 1957 5 Sheets-Sheet 1

INVENTOR.
EDWARD T. STRICKLAND
BY
ATTORNEY

April 24, 1962 E. T. STRICKLAND 3,031,361
PROCESS FOR MAKING A WOUND LAMINATE AND ARTICLE THEREOF
Filed Jan. 22, 1957 5 Sheets-Sheet 2

INVENTOR.
EDWARD T. STRICKLAND
BY
ATTORNEY

April 24, 1962     E. T. STRICKLAND     3,031,361
PROCESS FOR MAKING A WOUND LAMINATE AND ARTICLE THEREOF
Filed Jan. 22, 1957     5 Sheets-Sheet 5

INVENTOR.
EDWARD T. STRICKLAND
BY
Clinton L. Mathis
ATTORNEY

United States Patent Office

3,031,361
Patented Apr. 24, 1962

3,031,361
PROCESS FOR MAKING A WOUND LAMINATE AND ARTICLE THEREOF
Edward T. Strickland, Ellisport, Wash., assignor to Philbrick-Strickland Laminates, Inc., Vashon, Wash., a corporation of Washington
Filed Jan. 22, 1957, Ser. No. 635,210
10 Claims. (Cl. 154—43)

My invention relates to the process of fabricating multi-layers of adhesively bound yarns of discrete fibers, the product thereof, and apparatus employing such process.

There is an increasing demand for high strength laminates, fabricated from fibers obtained from such materials, as glass, quartz, and asbestos—to name a few. Some of these laminates are particularly useful because of their physical characteristics, such as, radio frequency transparency, operational characteristics at elevated temperature, strength characteristics, weight characteristics, and other characteristics inherent therein. Such characteristics have increased the demand for such laminates, particularly in the aircraft art in connection with such parts as aircraft components, missile components, pressure vessels, tanks, body sections, fairings, wings, and radomes. In the fabricating of many of these parts, multi-layers of such fibers employing a proper adhesive and with exact control of distribution of the fiber as to location and as to distribution of axial as well as helical fibers are now of utmost importance. In view of the extensive use of glass as a source for fibers in this art, the invention is described in connection therewith. Also as the invention contemplates the use of long fibers, rather than chopped fibers, long filament fiberglass, except where the context requires another meaning, is referred to as glass or fiberglass.

For example in connection with radomes, which have in part a tapered section, the optimum product requires radio frequency transparency, exact control of thickness of each layer and of the completed laminate, exact control of distribution of both axial and helical glass and desired tensioning of the glass at the time of application.

Also in radomes, used for directional control, it is highly desirable to have (1) close control of the dielectric constant and (2) close control of the thickness of the laminate. The said control of the dielectric constant can be obtained by close control of the binder to fiber ratio and exact orientation of the fiber. By suitable control of both factors, a highly desirable product results having a low insertion phase difference. I have been able to produce, with my invention, radomes having an insertion phase difference of less than one degree (1°) (measured by an interferometer) which is to be compared with prior art devices having a similarly measured value from 4.5° to 8° and over. The difference of radome laminates made in accordance with my invention as compared to those of the prior art often can mean the difference between its failure and success.

Radomes possibly have the most rigid requirements of any glass laminate and in general the shapes include an aerodynamic tapered section or a construction having varying diameters. In such a section, it is readily apparent that a very critical problem exists in obtaining exact control of the distribution of the axial glass. Axial, as so used herein, refers to glass which is distributed generally in an axial direction of the object whereas helical glass refers generally to glass which is distributed helically and at a direction substantially at right angles to the axis of the object.

To a degree, the various articles mentioned require a multiplicity or a plurality of individual layers disposed in superposed relation and with a binder employed which is cured or solidified after lay-up or fabrication of the article.

It is an object of my invention to provide superposed layers of glass which are wound or laid up with various tensions so as to provide built-in frictional resistance to delamination obtained by compression in an inner layer and tension in an overlying layer.

In calculating strength of glass laminates, employing long glass filaments with closely controlled orientation thereof, only the strength of the glass is considered (resin strength being insignificant) and thus, obviously, precise controlled distribution of the glass, and glass to binder ratio is necessary to provide a structure meeting rigid specifications.

As an illustration of a multi-layer glass laminate, I may lay up or fabricate a construction employing layers in the order of 0.010 inch in thickness and employ 20 to 40 layers. A plurality of relatively thin layers with precise fiber distribution is important to obtain desired physical properties in many highly stressed products and of course many times multiplies fabrication problems. It is an object of this invention to overcome such fabrication problems.

I have found that it is necessary to lay up or fabricate a laminate with controlled distribution of fiber as each layer is formed as distinguished from uncontrolled distribution of fiber and thereafter attempting to machine the part to the desired dimensions. There is not only a loss of material and loss of time in attempting to machine each layer and/or the laminate to the desired dimension but the structural and electrical characteristics of individual layers or of the laminate do not obtain. Also the machining of each layer individually before the application of a superposing layer leads to structural weaknesses, at many times, because of poor secondary bonding between layers.

Radomes made in accordance with my invention have other improved properties, for example, low coefficient of thermal expansion, low temperature variation of dielectric constant, low loss tangent, and low change of boresight optimum frequency with temperature changes. The said properties, in many instances, are very substantially improved and in the order of 50%. Such improved properties are of utmost importance to the accuracy of "fire control" systems in guided missiles and aircraft.

Other objects and advantages of my invention will become apparent as the description of the same proceeds and the invention will be best understood from a consideration of the following detailed descriptions taken in connection with the accompanying drawings forming a part of the specification, with the understanding, however, that the invention is not to be limited to the exact details of construction shown and described since obvious modifications will occur to a person skilled in this art.

Figure 1:
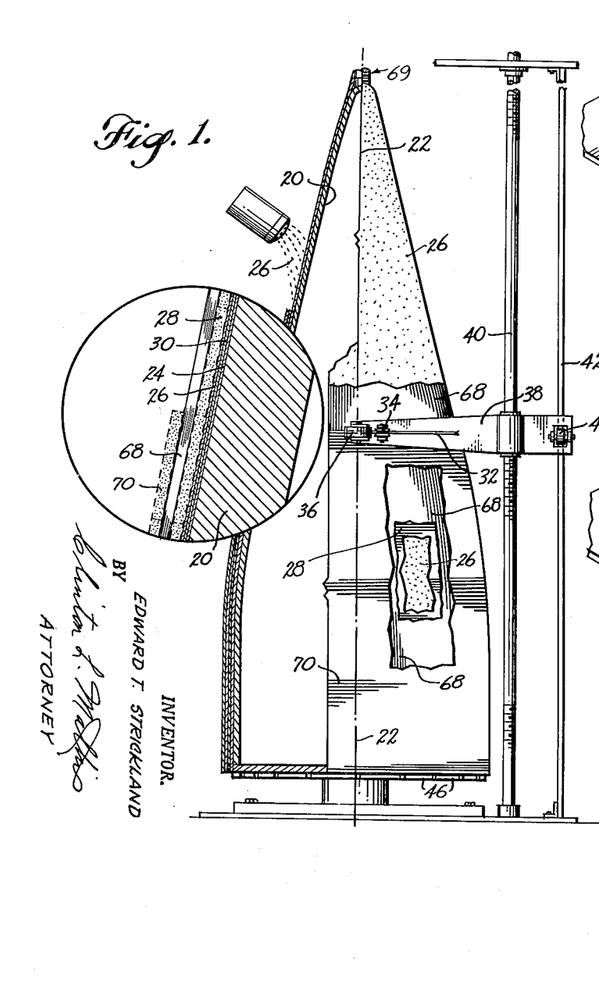
FIGURE 1 is a view of an ogive mold and illustrates diagrammatically structure embodying some steps in my process and parts are shown in section, some in side elevation, and some parts are shown enlarged within a circle.

Referring now to FIG. 1 of the drawings, a typical mandrel 20 is illustrated and to better illustrate my invention, the mandrel is substantially of ogive shape. In connection with the structure and process illustrated in connection with FIGS. 1 to 7 inc., the mandrel 20 is driven or rotates about its axis 22. On the mandrel 20 is first applied a mold lubricant or parting agent 24. The agent to be selected should be one which will withstand temperatures employed in curing the resin selected where the article is cured on the mandrel 20. Desired features in the agent 24 are that the same must remain as a lubricant when subjected to the temperatures and pressures involved in the curing of the resin in the article cured on the mandrel 20.

As will appear hereinafter, the glass is applied under pressure or tension and the resulting pressure therefrom is present during the curing of the resin although resins are employed which are preferably cured solely by heat and in the absence of external pressure on the article being cured.

After the application of the agent 24, I apply an abrasive 26 in granular form. The abrasive 26 may in most instances be dusted on the agent 24. In some instances a layer of adhesive 30 is applied over the agent 24. In the latter instance, the abrasive 26 will be dusted on the adhesive layer 30. The adhesive 30 should be the same or compatible with the resin employed in setting up the final laminate. The adhesive 30 is allowed to set or harden before the application of a helical winding thereover and will provide better anti-skid properties than an uncoated mandrel 20. The purpose of the abrasive 26 is to provide frictional resistance against axial movement of helical windings as they are applied to an inclined surface, as for example the surface of a cone. The heretofore unsolved problem of winding a uniform layer of helical windings down a cone is enhanced with the increase of tension on such windings. However, my invention provides for the winding of a uniform helical winding under tension down a cone and without any substantial slippage or sliding down the inclined surface. The abrasive is selected as one which will not adversely affect the dielectric property of the completed laminate (when such property is desired) or react with the materials employed therein and has the desired anti-skid physical properties, as its sharpness, and a suitable agent, as an example and not a limitation, is granular aluminum oxide.

Preferably the first layer applied over the parting agent 24 or over the layer 30 and over the abrasive 26 is a helical glass layer 28.

Glass, to provide the helical layer 28 as well as other layers, may be obtained from commercially available glass rovings. Each such glass roving contains a number of ends and each end contains 204 filaments. While I may employ rovings having different number of ends, I find it practical, for most laminates, and with the tensions I desire to apply, to employ rovings having approximately 30 ends. As used herein the term element refers to a single filament or several filaments grouped to be in effect one.

Before the application of the glass rovings to provide a layer, the rovings are wetted with the binder to be employed and then wound on a spool and then the spool is preferably (where the binder will permit) enveloped by a container and the spools are allowed to season for a period in excess of 24 hours so as to permit uniform migration of the binder around the various filaments involved. This procedure aids in the uniform distribution of a controlled amount of binder so that the glass is uniformly wetted with the binder.

In applying the first helical layer 28 of glass (see FIG. 1), glass roving 32 comes from a spool of glass fiber treated as indicated, and the roving 32 passes over a grooved pulley 34 and thence is reeved over a roll 36 and thence is delivered over driven mandrel 20 to provide the helical layer 28. The grooved pulley 34 and the roll 36 are rotatably mounted on one end portion of plate 38 and the plate 38 engages with and is pivotally supported by a lead screw 40, which lead screw is driven and synchronized with mandrel 20 by any suitable means (not shown). The other end portion of the plate 34 carries a cam follower 41, which in turn engages cam 42. Cam 42 is of suitable configuration to cause roll 36 to follow the surface of mandrel 20. The cam 42 is removable so that the glass roving 32 may be applied with the roll 36 operating against the helical layer 28 being formed or to operate at a distance therefrom. Also the glass roving 32 is under tension, such as 1 to 20 pounds, as it is being applied over the mandrel 20.

Whether one or more helical layers 28 is provided before the provision thereupon of an axial layer will depend upon the structural requirements of the laminate. Also the size of the groove in the grooved pulley 34 will determine the width of each helical winding providing the helical layer 28. The narrower the width of the groove in the grooved pulley 34, the narrower will be the width of each helical winding and in turn the more helical turns necessary to provide one inch of width of helical glass 28.

After the application of the desired number of layers of helical glass 28, then glass at right angles to said helical glass or axial glass is provided. In connection with FIGS. 1 to 7 of the drawings, the axial glass is provided in the form of a plurality of gussets, each of which gussets is substantially triangular in shape and a plurality of the said triangles are provided to provide an axial layer of glass conforming to the shape of the mandrel or in other words to the form over which the laminate is fabricated.

Figures 2, 3:
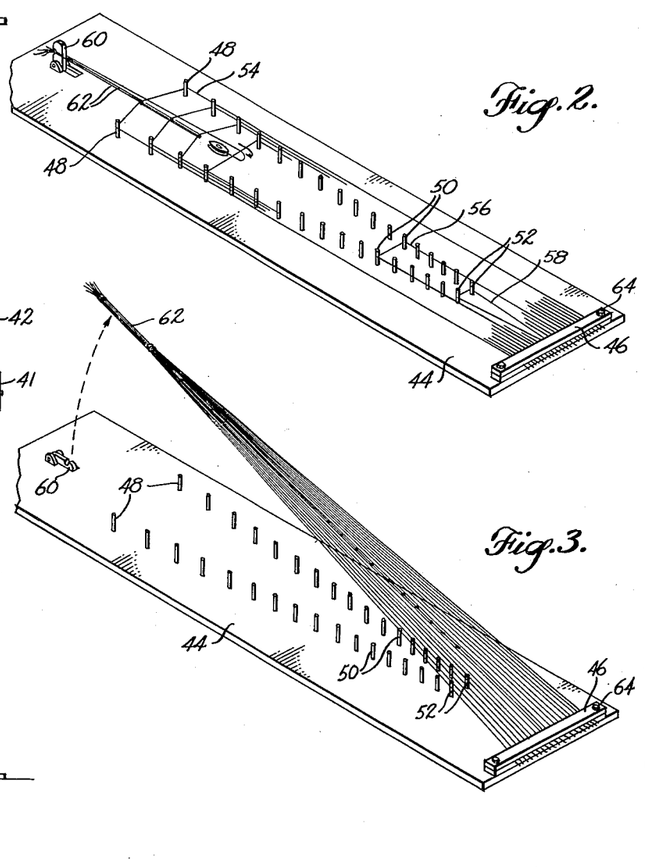
FIG. 2 is a perspective view illustrating apparatus forming a gusset, which may be employed in laying up axial glass to be employed in my invention.
FIG. 3 is a view similar to FIG. 2 showing a method of removing the laid up axial glass of FIG. 2 for use in connection with my invention.

Now referring to FIG. 2, a gusset board 44 is of suitable length and width to provide a triangular shaped gusset of desired configuration. The gusset board 44 carries a releasable end clamp 46 and a plurality of sets of pins, three sets of pins being marked for illustration as 48, 50 and 52. A roving 54 will be started with the clamp 46 and around pins 48 and back to the clamp 46. Other rovings as illustrated will be started, such as a roving 56 starting from the clamp 46 and thence around both of the pins 52 and thence back to clamp 46. As a further example, another roving 58 will be started from the clamp 46 and thence around pins 52 and thence under the clamp 46. The clamp 46 will be sufficiently loose at this stage so that after the application of slight tension, all of the various rovings may be made taught as indicated in FIG. 2 of the drawings and then the clamp 46 has its jaws moved toward each other to hold the taughtness thus obtained. Next a suitably compatible material to a glass roving such as nylon threads is started on a bobbin and first secured to a releasable post 60 and then the nylon 62 will be passed under the intermediate portion of the roving 54 between pins 48 and thence back around the post 60 and thence under successive cross portions of rovings successively and in turn successively around the post 60 and during such succession the nylon 62 will pass under and thence over a roving 56 between pins 50 and eventually successively under and then over a roving 58 disposed between pins 52.

The clamps 46 may comprise two separable members secured together by through bolts 64 and the clamps 46 may be held together by one set of nuts on the bolts 64 and the clamps may be held against the gusset board 44 by a second set of nuts on the bolts 64. Thus it is possible to remove the clamps 46 from gusset boards 44 and at the same time maintain the clamping relation between the jaws of clamp 46 and the various rovings such as the rovings 54, 56 and 58. Also the various pieces of nylon 62 which were secured or laced about the post 60 may be removed as a unit and thus the gussets so made up may be transferred by engaging one hand with the nylon 62 and the other hand with the clamp 46.

Figure 6:
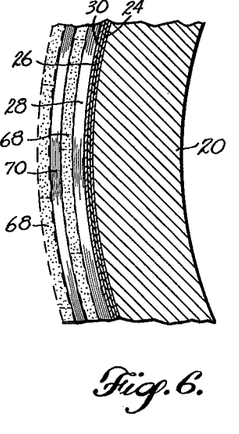
FIG. 6 is a fragmentary enlarged sectional view taken substantially on broken line 6—6 of FIG. 4.

FIG. 3 in part illustrates the removal of a gusset formed of axial glass from a gusset board 44 and the gusset so removed is applied over a layer of helical glass as the layer 28 as is illustrated in connection with FIGS. 4 and 6 of the drawings. The various clamps 46 are secured to the base end of the mandrel 20 as by securing such clamps 46 by screws 66 to the base or large end of the mandrel 20. The apex end of the gusset is secured to the mandrel by securing the nylon threads 62 to a common clamp 67 disposed in spaced relation to the apex of the mandrel, which clamp 67 is secured to adjustable tensioning device 69. The number and sizes of gussets to be employed are such that there is a substantially uniform distribution of axial fiber in a layer 68 over the layers of helical fibers as the layer 28. Again the thickness and amount of layers 68 to be provided will depend upon the loading requirement of the completed laminate.

In order to fix the relative position of the individual fibers forming the axial layer 68, an overlying layer 70 of helical fibers is employed and the same is wound over the axial layer 68 and is formed similar to the forming of layer 28. Again the thickness of a layer of helical glass 70 and the amount of such layers will depend upon the loading requirements of the completed laminate.

In applying the helical layers such as layers 28 and 70, they are applied while the glass roving providing the same is under suitable tension. The tension may be in the order of approximately 1 to 20 pounds and the amount of tension is reflected in the final laminate. Also the greater the tension the more difficult is the fabrication of the completed laminate. Also the rovings forming the axial layer 68 are under tension as they are applied and such tension may be obtained by moving the tensioning device 69 axially away from the clamps 46 which are secured to the base of the mandrel 20 and this after the various pieces of nylon 62 have been engaged with the clamp 67 and in turn tensioning device 69. Desired tension in the axial glass may be in the order of 0 to 15 pounds.

In the event that a layer of axial glass, as layer 68, is too thick to properly position the same by a superposed layer of helical glass (see FIG. 7), then a superposed layer of a relatively elastic material, as nylon 72, may be employed before curing of the adhesive and then removed after the curing (if desired).

Various helical layers and various axial layers are superposed until a laminate of the desired number of layers and desired thickness and control of thickness of individual layers is obtained in accordance with the stress requirements of a particular laminate.

After completely winding or laying up the laminate, then the laminate has its adhesive cured at desired temperature.

Present day requirements of adhesively bound fiberglass laminates used in connection with guided missiles and radomes specify adhesives withstanding temperatures in ranges exceeding 500° F. A laminate laid up on a mandrel 20 is thereafter subjected to the temperatures required to cure the adhesive employed therein. Thereafter if the laminate is to be used in precision fields, there will be some machining of the external periphery of the laminate, while it is still on the mandrel 20, to meet dimensional requirements of the particular specifications of the part. However, the amount of machining required is relatively insignificant as compared to a process which attempts to machine a part to size rather than my process of building it to size.

After the laminate is cured on the mandrel 20, it may also be post cured on the mandrel with my invention. Then the usual cleaning up operation obtains, including removing clamps 67 and tensioning device 69 and suitably shaping or polishing or otherwise operating on the apex of the completed laminate. Also after suitable treatment to the external periphery of the laminates, finally the laminate is trimmed to length and cut from the mandrel leaving a portion of the base of the laminate secured to the clamps 46 and such clamps 46 are removed with the desired trim. Normally an axial jack is required to move the completed laminate from the mandrel 20. The amount of jacking pressure to be employed and the technique of removing will depend to a measurable extent upon the tension employed in applying the glass rovings and also to the character as to temperature of setting of high temperature setting thermoset resin. However with the technique of my invention, I have found that I am able to remove the laminate from the mandrel even though the mandrel has been laid up and cured with high tension in the glass and high setting thermosetting resin.

The apparatus and method involved in FIGS. 1 to 7 of the drawings indicate to a certain extent manual as well as machine steps in laying up the laminate. For example the mandrel 20 is mounted to be driven or rotated about its axis and in addition the axial fibers are laid up from a plurality of gussets. My invention is not limited to such particular illustration of my method and a machine depicting the use of my method is illustrated in FIGS. 8 to 18 of the drawings. Here both the axial and the helical fibers are laid up mechanically as distinguished from manually.

The construction, illustrated in FIGS. 8 to 18, contemplates a mandrel which is non-rotatably mounted and helical glass is applied by revolving the spool, carrying the helical glass, about the axis of the mandrel. In such a construction (see FIG. 9), a base 74 is secured to any suitable support and the base 74 is keyed by keys 76 with the mandrel 78. A plurality of rods (see FIG. 8), as rods 80, 82 and 84 are disposed about the periphery of the mandrel 78 and the spacing between the rods will depend upon the size of the rovings of axial glass to be applied. For example, if glass roving having 30 ends is employed and if it is desired to have substantially 8 rovings to each inch, then the rods will be spaced apart at one quarter inch centers and hence for illustration purposes, the rods 80, 82, and 84 are widely spaced to avoid confusion in the drawings. The rods 80, 82 and 84 are slidably mounted in rod return and cut off plate 86; rod positioning plate 88 and rod guide plate 90. The plates 86, 88 and 90 are mounted to move longitudinally of the rods 80, 82 and 84 and likewise the said rods 80, 82 and 84 are mounted to move relative to the said plates 86, 88 and 90.

Figure 9:
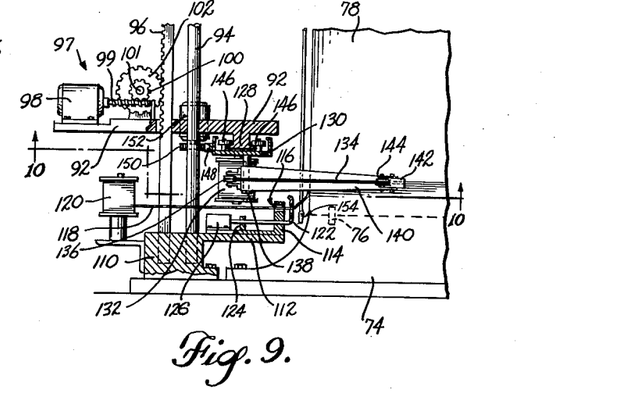
FIG. 9 is a fragmentary enlarged view, with parts in elevation and in section, illustrating parts at the base of the construction of FIG. 8 and also showing parts omitted from FIG. 8.

Referring also to FIG. 9 of the drawings, the plate 92 is fixed on guide rods 94 only two of which are shown for purpose of illustration. Obviously more guide rods will be useful and preferably employed. Also the guide rods 94 slidably support plates 86, 88 and 90.

Figure 8:
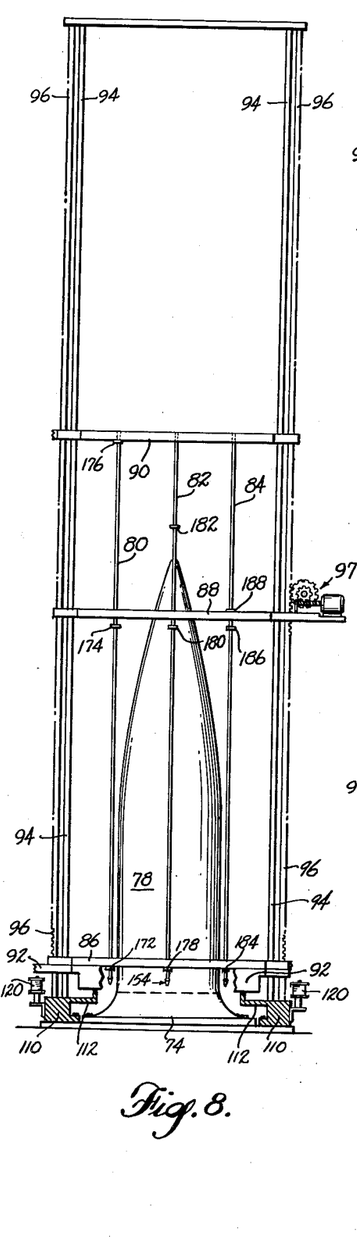
FIG. 8 is a somewhat diagrammatic view, with parts omitted, showing apparatus for mechanically laying up axial and helical glass.
Figure 10:
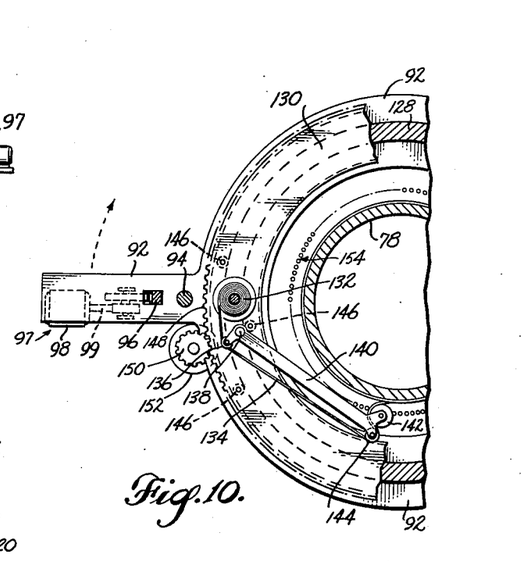
FIG. 10 is a fragmentary sectional view taken substantially on broken line 10—10 of FIG. 9.

Referring to FIG. 8 and also to FIG. 10 of the drawings, each of the plates 86, 88, 90 and 92 is moved individually and vertically and this may be accomplished by employing mechanisms including fixed racks 96 and individual prime movers for each plate functioning against said fixed racks. While there will be two prime movers for each plate operating against two racks (to eliminate twisting movements) only one prime mover 97 is illustrated in FIG. 8 in connection with the plate 88 and one prime mover 97 (on a somewhat larger scale) is shown in connection with FIG. 9 of the drawings to move plate 92. In the interest of clarifying the drawings, no prime mover is illustrated in connection with plates 90 and 86 although such plates are moved in the same manner as plates 88 and 92.

Each of the plates 86, 88, 90 and 92 mounts a motor and associated parts. For example, plate 92 (see FIG. 9) mounts motor 98 which drives a worm 99 and the worm 99 meshes with a worm wheel 100. The worm wheel 100 is fixed on shaft 101 and shaft 101 carries pinion 102, and pinion 102 meshes with rack 96. Motor 98 is a reversible motor and may be driven in either direction by suitable controls (not shown). The motor 98 thus determines the relative vertical position of a plate 92, 86, 88 or 90 (such as plate 92 in connection with FIG. 9) and there are preferably two motors 98 in connection with the elevating of plate 92. There will be similar assemblies or prime movers 97 in connection with the other plates 86, 88 and 90. The worm and worm wheel arrangements in the prime movers 97 provide for self-locking so any of said plates 90, 88, 86, 92 may be moved to a desired elevation and such elevation will be maintained upon de-energizing of the sets of motors involved in the prime mover 97 for a particular plate 92, 86, 88 and 90.

An annular base 110 is employed to support guide rods 94 and racks 96. Base 110 also supports by a plurality of arms 112 and a guide ring 114, which ring 114 is provided with apertures or openings 116 to provide a fair lead for a roving 118 from a spindle or spool 120. The openings 116 will be circumferentially spaced about the ring 114 and there will be one spool 120 for each opening 116 so as to provide for ready transfer of the roving 118 from each of the spools 120 and at a desired location circumferentially about the mandrel 78. A treadle 122 is employed in connection with each roving 118 from a spool 120. Each treadle 122 is mounted for sliding movement relative to the base 110 by a sleeve 124. In order to move the foot portion of the treadle into engagement with windings on the mandrel 78, the treadle 122 is actuated by a double acting solenoid 126 and in one position the said treadle 122 has its foot portion engaging against glass fiber on the mandrel 78 and in its other position it is removed therefrom. The said solenoid 126 is controlled to provide a sequence of operation later described in connection with the mode of operation of the structure.

Plate 92 (see FIGS. 9 and 10) supports a track 128 and track 128 supports for rotary movement plate 130. Plate 130 supports a spool 132 which functions as a source of glass rovings to provide helical glass as by roving 134. Idle sheave or pulley 136 is mounted by plate 130. Plate 130 also carries a pivot means 138 which pivotally supports an arm 140 and arm 140 pivotally supports a rotatable pulley or sheave 142. Also a grooved pulley 144 is carried by the arm 140 and is mounted for rotary movement. The size of the groove in groove pulley 144 is such so as to determine the width of helical windings applied on the mandrel 78. The roving 134 leaves idle pulley 136 and is then led about grooved pulley 144 and thence about pulley 142 and thence on the mandrel 78.

As the spool 132 must revolve about the axis of the mandrel 78 to apply a helical winding, the plate 130 is mounted for movement about the mandrel and is driven. This may be accomplished by providing bearings 146 to interfit with track 128 and then providing a rack 148 on the plate 130. A pinion 150 is driven by motor 152 as illustrative of a suitable way of driving the plate 130. Thus at all times the motor 152 is energized, a roving 134 from the spool 132 will be applied as a helical winding about the mandrel 78.

Figure 13:
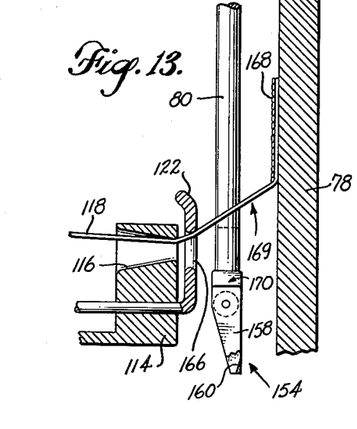
FIG. 13 is an enlarged fragmentary view in elevation of parts shown in FIG. 9 and showing additional details.
Figure 14:
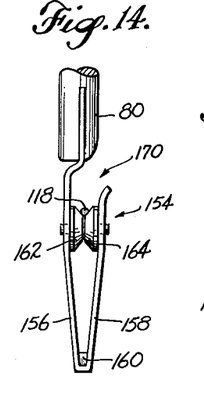
FIG. 14 is a view in elevation taken substantially on broken line 14—14 of FIG. 15.
Figure 15:
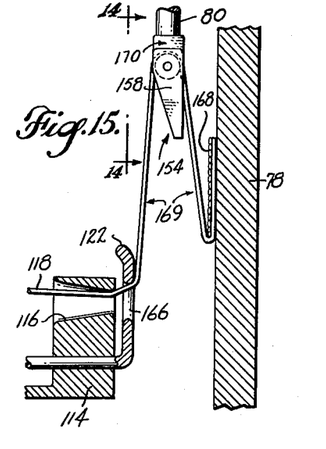
FIG. 15 is a view similar to FIG. 13 and shows positions the parts assume during operation subsequent to those illustrated in FIG. 13.
Figure 16:
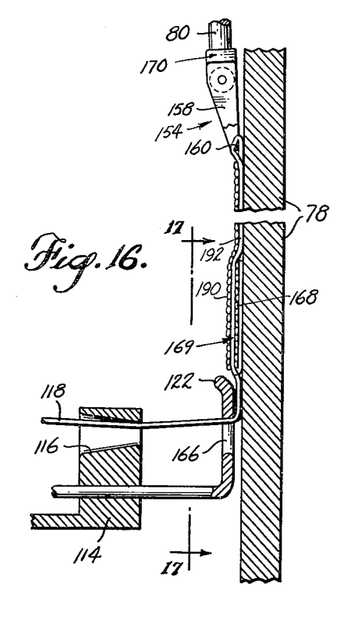
FIG. 16 is a view similar to FIG. 15 and shows positions the parts assume during operation subsequent to those illustrated in FIG. 15.

Each of the rods 80, 82 and 84 has an end portion as is indicated in FIGS. 11 to 18 of the drawings and by way of illustration such end portion is numbered generally 154 and the details as to one of said end portions 154 is best shown in FIGS. 13 and 14 of the drawings and is illustrated by way of example in connection with the rod 80. The said end portion 154 comprises a spring material side wall member 156 secured to a rod as the rod 80. The other side wall portion 158 is also made of spring material and the walls 156 and 158 are normally urged toward each other. The side walls 156 and 158 are separated by a cutter member 160. The side arm 156 supports a portion of a pulley 162 and the side arm 158 supports the other portion 164 of said pulley so that the parts 162 and 164 together form a split pulley. The two halves of said split pulley are spring loaded so that they are urged toward each other but they may be separated by pressure of a roving tending to pass between the said two parts 162 and 164 and if the pressure is sufficient to overcome the spring pressure accomplished by the arms 156 and 158.

Referring now to FIG. 9 of the drawings, a roving 118 from a spool 120 will pass through an appropriate opening 116 in the guide ring 114 and thence pass (see FIG. 13) through the eye 166 of the treadle 122. The said roving 118 is initially secured to the mandrel 78 by a lashing 168.

In view of the fact that each of the rods 80, 82 and 84 will each have an end portion 154 which will operate in a similar manner, only the operation so far as this portion of the description is concerned will be made in connection with the rod 80. The rod 80 is moved by the ring 86 at the end of each cycle, so that at the start of a cycle the end portion 154 is below the loop portion, generally designated by 169, of a roving 118. Then at the start of a cycle and as rod 80 is raised, the end portion 154 passes the loop 169 in the roving 118 between the treadle 122 and the lashing 168. Upon upward movement of the rod 80, the roving bite portion 169 will pass through the opening space generally designated by 170 and the bite of the roving 169 will be supported by the pulley comprising the parts 162 and 164.

The rod 80 (see now FIG. 8) carries stops 172, 174 and 176; the rod 82 carries stops 178, 180 and 182; and the rod 84 carries stops 184, 186 and 188. At the end of each cycle of operation, the plate 86 in moving to the position shown in FIG. 8 of the drawings engages with the stops 172, 178, and 184 and thus moves the rods 80, 82 and 84 to the positions shown in FIG. 8 of the drawings. At the same time the plates 92, 88 and 90 are also moved to the positions shown in FIG. 8 of the drawings and thus we have shown in FIG. 8, the end of one cycle or the start of a new cycle.

The plates 86, 88 and 90 with the plate 86 traveling first or in any event not later than the plates 88 and 90, move to the positions shown in FIG. 11 of the drawings.

Obviously if the plate 86 should move after the plate 88, the plate 86 would prevent the rods 80, 82 and 84 from moving as the said plate is engaged with the stops 172, 178 and 184. As the plate 88 moves from the position shown in FIG. 8 of the drawings to the position shown in FIG. 11 of the drawings, the plate 88 successively contacts stops 188, 182, and 176 respectively on the rods 84, 82 and 80. This will move the rods 84, 82, and 80 amounts indicated in FIG. 11 of the drawings.

At the same time the plate 90 must be moving or it would engage stops 176, 182, and 188 carried by rods 80, 82 and 84. Then the winding plate 92 carrying the mechanism for providing a helical winding 190 (FIGS. 16–18) from roving 134 (FIGS. 9–10) and disposing said helical winding either over the mandrel 78 or over an axial layer 192 (FIGS. 16–18) from a roving 118 (FIGS. 9–10). The plates 92, 86, 88 and 90 are each shown in connection with individual means for moving the same and the movements of these various plates is cycled to provide the mode of operation described but the timing means for moving said plates is not indicated in the drawings as the same may be accomplished by a variety of mechanical means.

Figure 11:
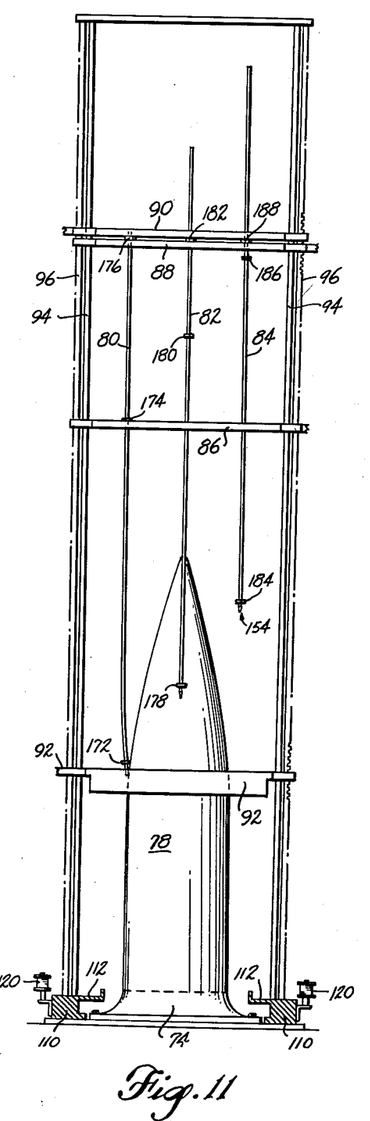
FIG. 11 is a somewhat schematic view of FIG. 8 and illustrating the positions parts assume during operation.
Figure 12:
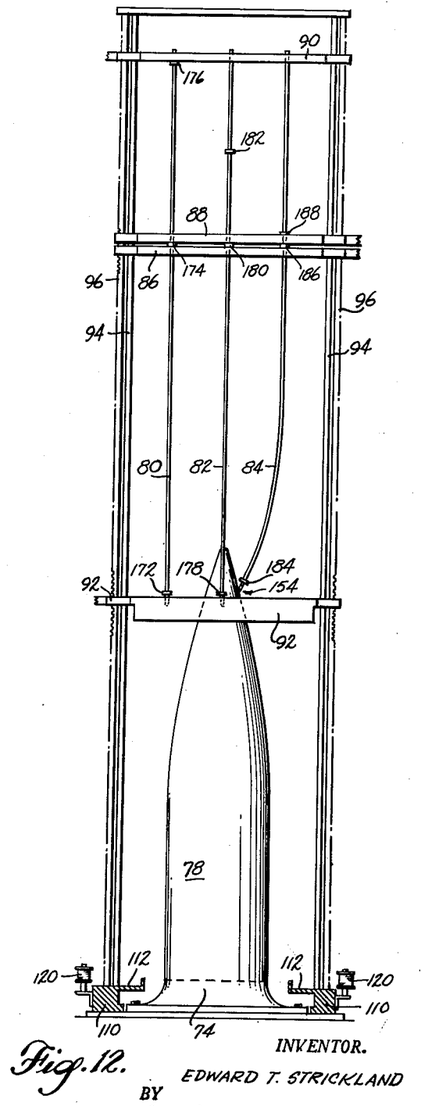
FIG. 12 is a view similar to FIG. 11 and showing parts at subsequent positions during operation.
Figures 17, 18:
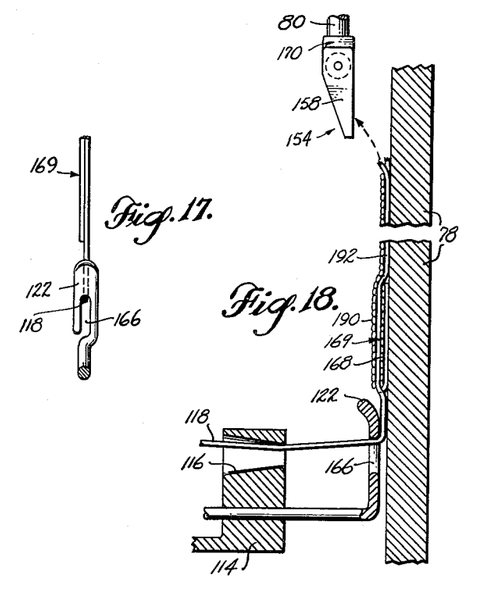
FIG. 17 is a fragmentary elevational view taken substantially on broken line 17—17 of FIG. 16, with parts omitted.
FIG. 18 is a fragmentary view similar to FIG. 16 and shows positions the parts assume during operation subsequent to those illustrated in FIG. 16.

The first movements of the plates 86, 88, and 90 are to move from the position shown in FIG. 8 of the drawings to the position shown in FIG. 11 of the drawings. Then the mandrel 78 is slightly turned relative to plate 92 a distance equal to the width of a roving 118 so that the two parts of the loop portion 169 will be alongside of each other (as best indicated in FIG. 18) rather than on top of each other. Then the plate 92 gradually rises as the helical winding 190 is being applied over the axial layer 192 until the said plate 92 is substantially in the position shown in FIG. 11 of the drawings. At this position, the helical winding 190 is substantially in the position shown in FIG. 16 of the drawings. At such portion in the cycle, then the plates 92, 86, 88, and 90 are interconnected so that they will all rise as the plate 92 rises in applying the helical winding 190.

As the plate 86 engages with the stop 174 (FIG. 11) tension is placed on the rod 80 and this tension on the rod 80 causes the loop portion 169 of roving 118 (see FIGS. 14 and 15) to pass between the parts 162 and 164 forming a pulley so that said roving 118 engages the cutter 160 and the roving is cut as indicated in connection with FIG. 18 of the drawings so that the rod 80 is disengaged from the loop portion 169 of the roving 118 and springs sidewise. Also the rod 80, as well as its end portion 154, is continuously moved by the plate 86 so as to be out of the way of the application of further helical glass to provide the helical winding 190. Successively the same mode of operation obtains in connection with the rods 82 and 84 and their stops 180 and 186 until the completion of the helical winding. Then by appropriate cycling of the movement of the plates 92, 86, 88 and 90 the parts are returned to the original position shown in FIG. 8 to end one cycle or to have the parts in the position to assume a second cycle. At the end of a cycle for the starting of a second cycle, a loop 169 will always be available to be engaged in the opening 170 of each of the end portions 154 of the rods employed.

From the foregoing it will now be apparent that my process of making a laminate embodies the use of a yarn of discrete fibers. As an example thereof, I have set forth the use of commercially available glass rovings. In such glass rovings there are a number of ends and each end contains a number of discrete fibers. For handling purposes, such rovings are furnished with a slight spiral twist in each roving to keep each roving as a unit. Such twist may be eliminated or increased, as desired, in my invention to aid in the control of the width and to the application of, an applied winding.

Next I form a laminate over a form or mandrel having cross sectional areas of different sizes at spaced locations normal to an axis thereof. Commonly employed mandrels in the aircraft art embody ogives, cones, and the like by way of example. The mandrel may be either driven as indicated in connection with FIGS. 1 to 7 of the drawings or the mandrel may be stationary as is indicated in connection with FIGS. 8 to 18 of the drawings.

Preferably as best indicated in connection with FIGS. 1, 4, 6 and 7 of the drawings, a parting agent 24 is employed over the mandrel before the first layer is applied, which first layer may be either helical or axial glass. Next preferably an adhesive layer 30 is applied and either on the parting agent 24 or the adhesive layer 30 is applied an abrasive 26. The abrasive 26 also may be applied on the mandrel just prior to the application of a helical layer 28 and the abrasive bound in place by the helical layer. In any of the instances the abrasive layer 26 is of very substantial value where a helical layer is being applied on an inclined or sloping surface to prevent slippage of the helical windings as they are applied in forming the helical layer.

Next in my invention I provide either as a first layer or a subsequent layer a layer of axially directed yarn which has controlled thickness and controlled distribution of yarn as the layer is laid-up. In many instances uniform thickness and uniform distribution of the axial glass is positively required, whereas in other instances, control to provide a desired thickness or a desired distribution at specific areas is required by specifications in the aircraft art. Either uniformity or control of distribution as a layer is laid-up is well within the scope of my invention.

Due to the fact that I employ a yarn or end or roving comprised of discrete fibers, the fibers of one helical or axial windings will tend to intermingle with those of another so that a layer is substantially uniform when laid-up and either layer comprises substantially side by side windings.

Figure 4:
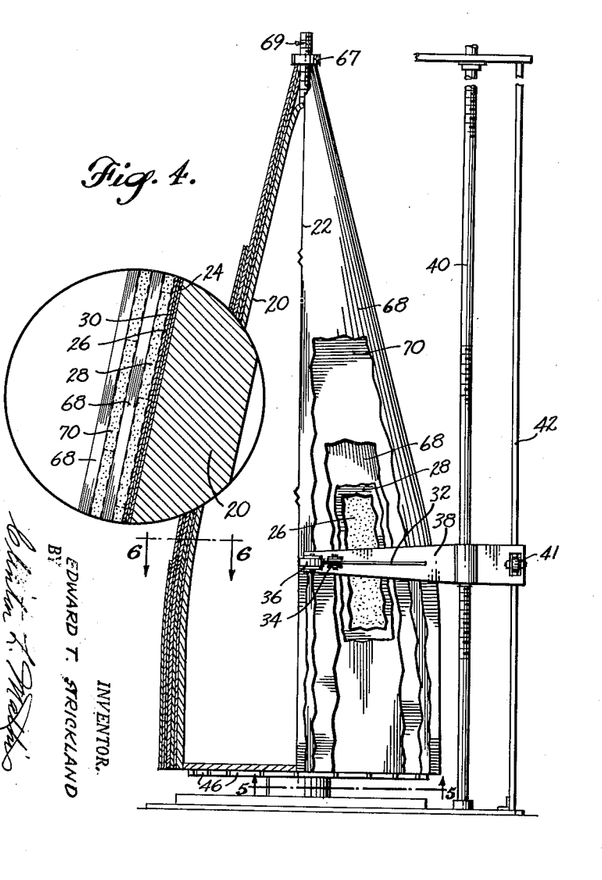
FIG. 4 is a view similar to FIG. 1 of the drawings and showing, in addition, structure embodying subsequent steps over those illustrated in connection with FIG. 1 of the drawings.
Figure 5:
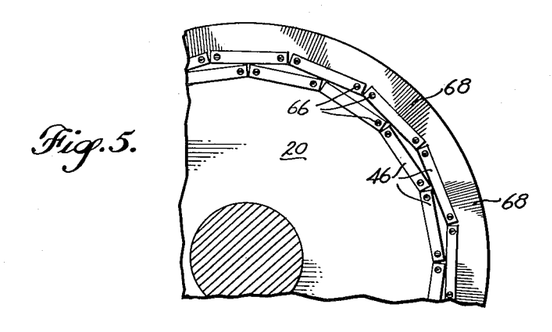
FIG. 5 is an enlarged fragmentary bottom plan view, with parts in section, taken substantially on broken line 5—5 of FIG. 4.

In providing for controlled distribution of axial glass, I may employ gussets as is best taught in connection with FIGS. 2, 3 and 4 of the drawings so that the axial fibers will be of varying lengths depending upon the contour of the form or mandrel or I may obtain similar results as is indicated in connection with the mechanism best shown in FIGS. 8 to 18 of the drawings. In either event, I am controlling the distribution of the axially directed glass by providing axial glass having unequal lengths.

In applying either helical glass or axial glass, the glass is applied while under tension to aid in controlling the glass to resin ratio. Also in controlling the resin to glass ratio, preferably the resin or binder is applied to the fibers and they are allowed to season before use to augment uniform distribution of the binder over the discrete fibers.

In connection with FIGS. 8 to 18 of the drawings, I have in effect provided a plurality of gussets made at the same time and arranged in side by side relationship to provide a controlled distribution of the axial fiber while in FIGS. 1 to 8 inc., and particularly FIGS. 2 and 3, I have provided a plurality of individually formed gussets which when used provide a continuous layer of side by side gussets which is formed at one time in connection with FIGS. 8 to 18 of the drawings.

In order to control the width and thickness of a winding as the same is applied to a mandrel or form, I employ a grooved pulley such as the grooved pulley 34 of FIG. 1 or the grooved pulley 144 of FIGS. 9 and 10 and by the control of the depth and width of the groove in the pulley, I can control the depth and width of a winding as applied to a form or mandrel. Such construction aids in the control and distribution of the fiber on the mandrel or form.

As indicated in connection with helical windings as they are being applied over a sloping or inclined surface, the abrasive 26 functions as a slide resistant layer preventing sliding of the helical layers as they are being wound and particularly over a mandrel or form where the shape or incline augments sliding action down the same.

Figure 7:
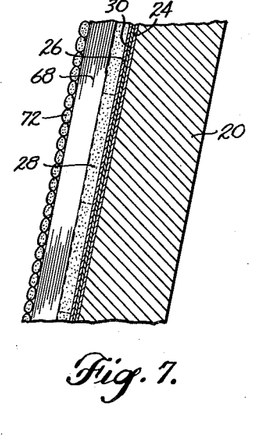
FIG. 7 is a fragmentary sectional view, of a modified form of construction, and viewed susbtantially at right angles to the showing of FIG. 6.

In connection with FIG. 7 of the drawings, an answer is set forth affecting problems resulting from the application of a relatively thick axial layer 68. Here a material such as nylon 72 is employed and the nylon, under the winding and curing conditions involved, has relatively high elongation or elasticity. In respect to the fibers involved, as glass fibers, nylon has high tensile strength and suitable physical properties under the curing conditions involved. The nylon layer 68 appears to function as a compressing elastic external sleeve both during winding and during curing. After curing or partial curing of the layer 68, the nylon layer 72 may be removed and a subsequent helical layer of desired fiber may be applied over a cured or partially cured layer 68.

In connection with FIGS. 8 to 18 of the drawings, I have illustrated the end portion 154 which functions as loop engaging means for engaging a loop of yarn so that I may have loops of different lengths to thus provide axial glass of different lengths to control the distribution of axial glass. In connection with such loop engaging portions 159 I have shown means to move the same, such as rods or pulling means 80, 82 and 84 and various stops on such rods which are movable by mechanisms such as the plates 86 and 88. The pulling means for the end portions 154 may be properly guided by the plates 90, 88 and 86.

In cutting off the loops, as by the cutters 160 (see FIG. 14), the cutter may operate in the mid portion of a loop or to one side thereof. If the cutter operates in the midportion of a loop, then of course we will have two pieces of yarn of the same length whereas if the cutter operates to one side or the other of the center of the loop, then we will have two pieces of yarn of unequal length.

I have set forth glass fibers as an illustration of fibers to be employed in making laminates of my invention, however, it is to be understood that this is by way of illustration and not limitation. An appropriate binder will be employed in accordance with the fiber selected and the specifications of the laminate.

Obviously changes may be made in the forms, dimensions, and arrangements of the parts of my invention without departing from the principles thereof, the above setting forth only preferred embodiments of my invention.

I claim:

1. A radome having a portion of its longitudinal extent of a uniform wall thickness, said portion having an exterior surface which has a changing peripheral dimension along the longitudinal axis of the radome, the wall of the article comprising a plurality of pairs of alternately arranged layers of reinforcing filaments, the filaments in one of the layers of a pair being of varying length having a generally longitudinal extent and lying in spaced radial planes containing said longitudinal axis, the filaments in an alternate layer of a pair of layers extending generally laterally of and surrounding the longitudinally extending filaments and extending from end to end of said longitudinally extending filament layer, each layer of longitudinally extending filaments being of uniform thickness and having a substantially constant density of filament material throughout the portion of changing peripheral dimension with the greater number of filaments at the location of the larger peripheral dimension, and a binder for the filaments.

2. A radome having an axis and an exterior surface which over at least a portion of its longitudinal extent along said axis has a changing peripheral dimension comprising a plurality of alternately arranged pairs of layers of reinforcing filaments, the filaments in one of the layers of a pair having a generally longitudinal extent with adjacent groups of filaments throughout the periphery of the radome in said portion of changing peripheral dimension converging toward each other and toward a point lying on said axis of the radome and some of the longitudinal filaments being of unequal length, the filaments in an alternate layer of a pair of layers extending generally laterally of the longitudinally extending filaments, each such alternate layer being of generally uniform thickness and extending from end to end of said longitudinally extending filament layer, each layer of longitudinally extending filaments extending generally parallel to said exterior portion and being of uniform thickness and having a substantially constant density of filament material throughout the portion of changing peripheral dimension with more filaments at the largest part of the changing peripheral dimension, and a binder for the filaments.

3. A process for making a laminate having an exterior surface which over at least a portion of its longitudinal extent has a changing peripheral dimension comprising, laying up a layer of reinforcing filaments of varying lengths in a manner including a converging relationship of the filaments at the location of the changing peripheral dimension to provide a layer of uniform thickness and having a substantially constant density of filament material throughout the portion of changing peripheral dimension with the filaments all extending in the direction of said longitudinal extent, and the number of filaments in the layer becoming larger as the peripheral dimension increases, laying up an alternate layer of reinforcing filaments extending generally laterally of the longitudinally extending filaments with said alternate layer extending from end to end of said changing peripheral dimension, and setting a binding for the filaments in each of said layers.

4. A hollow laminate of a size to house components and having an exterior surface which over at least a portion of its longitudinal extent along an axis thereof has a changing peripheral dimension measured in planes normal to and spaced along said axis comprising a plurality of alternately arranged layers of reinforcing elements, the elements in one of the layers having a generally longitudinal extent, adjacent elements throughout the periphery of the laminate in said portion of changing peripheral dimension converging toward each other, the elements in an alternate layer extending generally laterally of the longitudinally extending elements with at least one such alternate layer extending from end to end of said changing peripheral dimension, said layer of longitudinally extending elements being of uniform thickness and the elements being in groups of unequal length to have a substantially constant density of element material and differing numbers of elements throughout the portion of changing peripheral dimension, and a binder for the elements.

5. A hollow article having a uniform wall thickness and an exterior surface which over at least a portion of its longitudinal extent along an axis has a changing peripheral dimension, the wall of the article comprising a plurality of alternately arranged layers of bonded reinforcing filaments, the filaments in one of the layers having a generally longitudinal extent, said filaments of longitudinal extent in said changing peripheral dimension converging toward each other and toward a point lying on said axis, the filaments in an alternate layer extending generally laterally of the longitudinally extending filaments, at least one such alternate layer extending from end to end of said longitudinally extending filament layer, and each layer of longitudinally extending filaments being of uniform thickness and some of the filaments being of unequal length to have a substantially constant density of filament material throughout the portion of changing peripheral dimension with the greatest number of filaments being at the location of the greatest peripheral dimension.

6. A hollow plastic radome with an interior of a size to house components having a portion of varying diameter and comprising a plurality of layers of reinforcing glass filaments with the filaments of one layer extending longitudinally in spaced radial planes containing the axis of the radome and the filaments of adjacent layers extending circumferentially, the circumferential filaments being wound to provide layers of substantially uniform thickness and having substantially uniform density of filaments per inch of length of the radome, and the longitudinal filaments forming a layer of substantially uniform thickness by having some of unequal length to provide a substantially constant density of filaments per inch circumferentially of the radome.

7. A hollow laminate having a tubular portion of reducing cross sectional area along the longitudinal axis thereof embodying a plurality of layers of reinforcing glass filaments with alternate layers, filaments in one layer extending longitudinally of the laminate, the longitudinal filaments being of varying lengths and in spaced radial planes containing said longitudinal axis to provide layers of substantially uniform thickness from end to end of the laminate and of substantially uniform thickness peripherally of the laminate and with more of said filaments in the layer at a location normal to the larger cross sectional area than in the layer at a location normal to the smaller cross sectional area, and the filaments in an alternate layer extending transversely of the longitudinal filaments and forming a layer of substantially constant thickness from end to end of the laminate.

8. The process of making a laminate formed of yarn of discrete fibres over a form having cross sectional areas of different sizes at spaced locations normal to an axis thereof comprising placing on the form a layer directed axially of the form and of substantially uniform thickness and of substantially uniform distribution of yarn by laying up an axially directed layer of substantially side by side binder coated unwoven and substantially uniformly distributed yarns lying in spaced radial planes containing said axis of unequal lengths under tension over said form and with more of said yarns on the surfaces normal to the larger cross sectional areas than those normal to the smaller cross sectional areas; placing a helically wound layer of substantially side by side binder coated unwoven warn under tension over said first mentioned layer and with the yarn in the second layer extending substantially at right angles to those in the first layer; and solidifying the binder.

9. The process of making a laminate formed of yarn of discrete fibers over a form comprising a tapered section comprising placing on the form a layer directed axially of the form and of substantially uniform thickness and of substantially uniform distribution of yarn by laying up an axially directed layer of substantially side by side binder coated unwoven and substantially uniformly distributed yarns of unequal lengths under tension over said form and with more of said yarns on the surfaces adjacent the base of said tapered section and gradually decreasing toward the apex thereof, said layer comprising a plurality of yarns positioned substantially simultaneous on said mandrel with their marginal side portions contacting; placing a helically wound layer of substantially side by side binder coated unwoven yarn under tension over said first mentioned layer and with the yarn in the second layer extending substantially at right angles to those in the first layer; and solidifying the binder.

10. The process of making a laminate formed of yarn of discrete fibers over a form having cross sectional areas of different sizes at spaced locations normal to an axis thereof comprising placing a layer directed axially of the form and of controlled thickness and of controlled distribution of binder coated yarns by laying up an axially directed layer of yarns of unequal lengths; placing on said first mentioned layer a helically wound layer of stressed yarns having greater elasticity than the first mentioned yarns to form a compressive sleeve during solidification of the binder; solidifying the binder; and removing the second mentioned yarns.

References Cited in the file of this patent

UNITED STATES PATENTS

| | | |
|---|---|---|
| 2,594,693 | Smith | Apr. 29, 1952 |
| 2,694,661 | Meyer | Nov. 16, 1954 |
| 2,726,185 | Howald | Dec. 6, 1955 |
| 2,749,643 | Scott | June 12, 1956 |
| 2,751,320 | Jacobs | June 19, 1956 |
| 2,778,404 | Macy et al. | Jan. 22, 1957 |
| 2,782,833 | Rusch | Feb. 26, 1957 |
| 2,905,578 | Rees | Sept. 22, 1959 |

FOREIGN PATENTS

| | | |
|---|---|---|
| 130,391 | Switzerland | Feb. 1, 1929 |